United States Patent Office 3,485,430
Patented Dec. 23, 1969

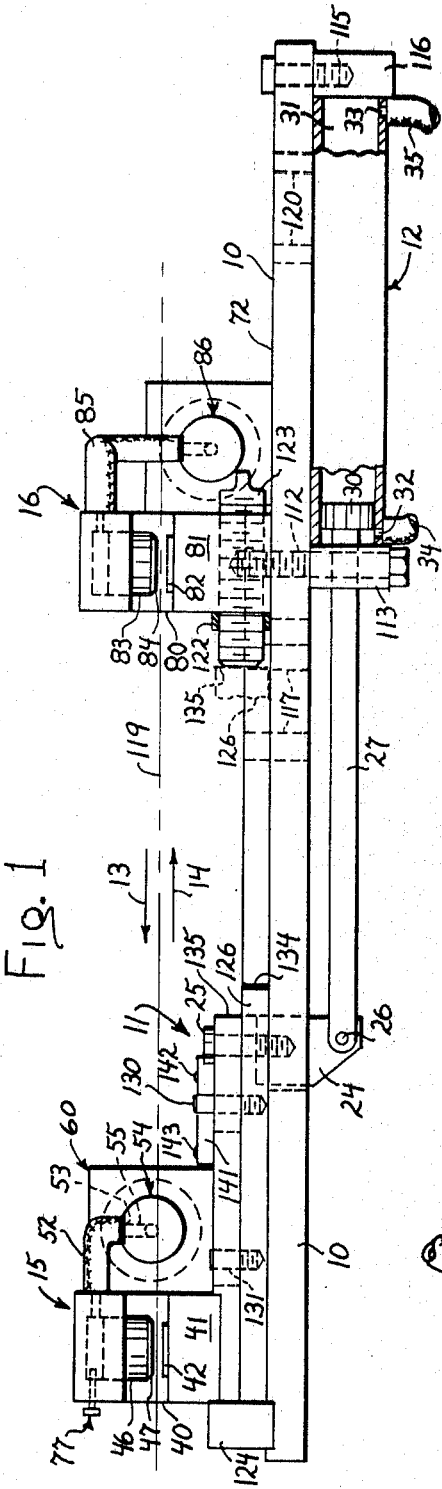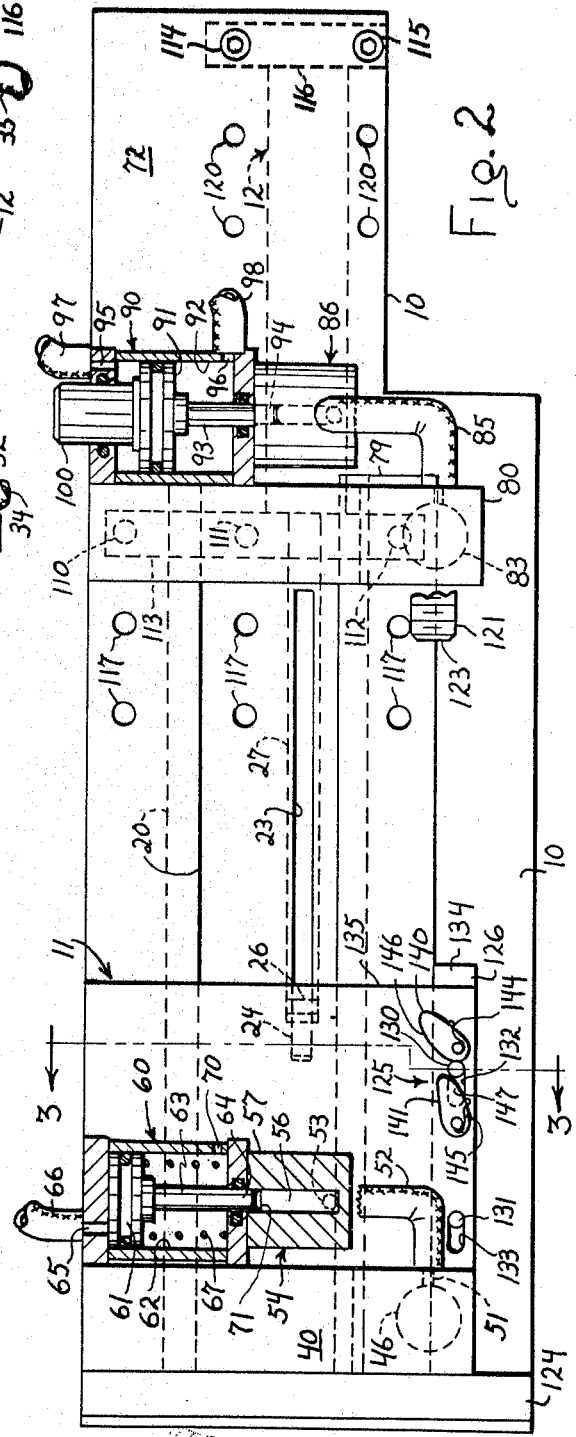

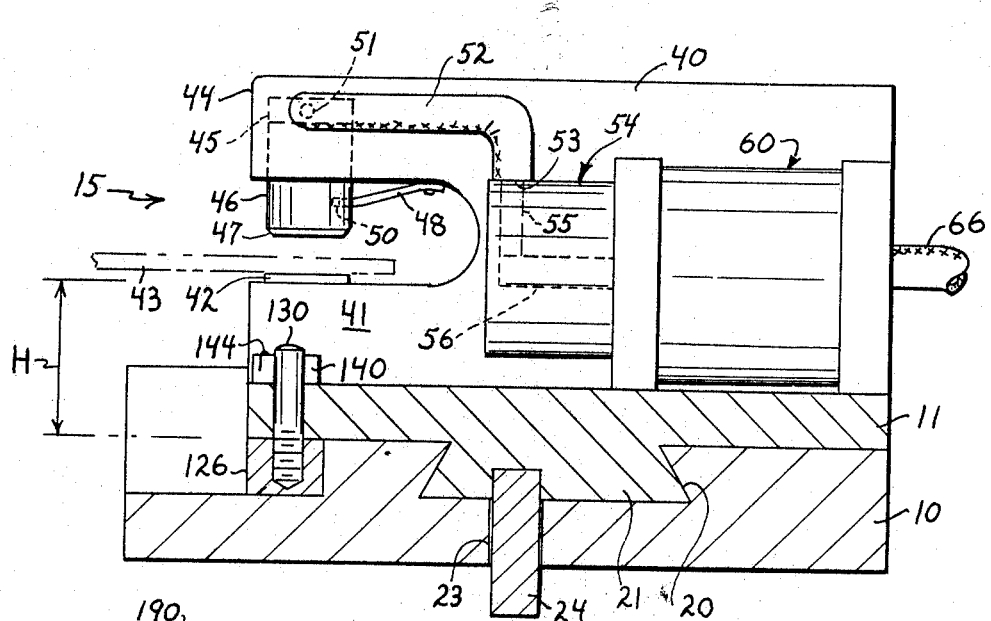
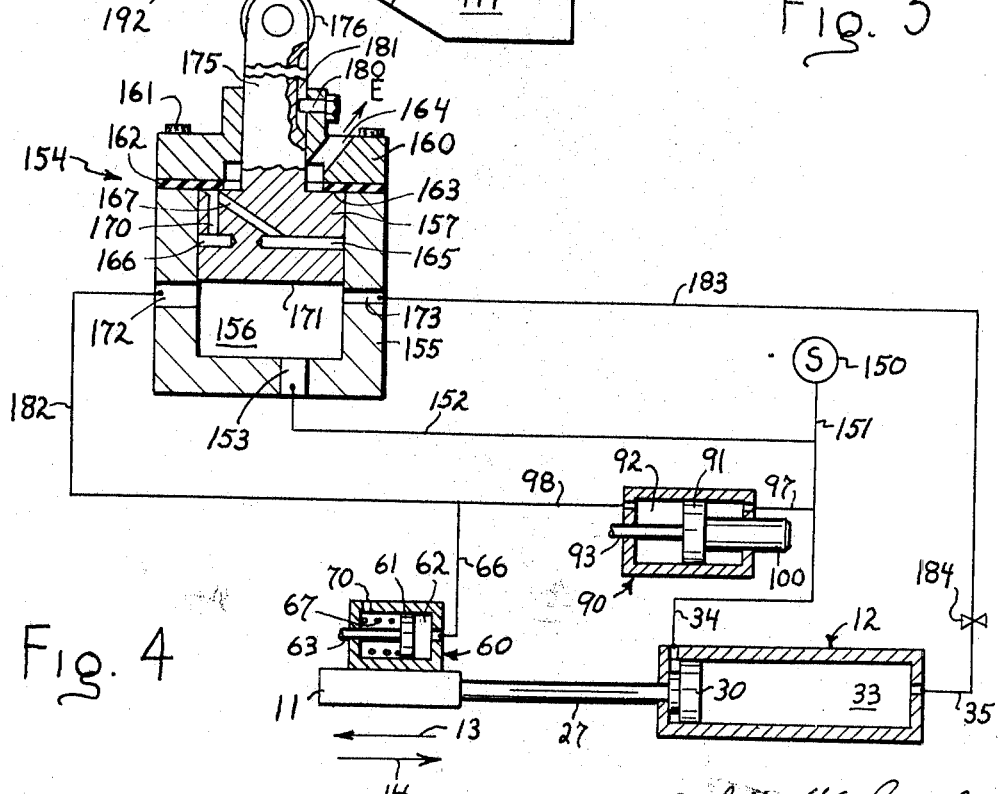
Fig. 3
Fig. 4

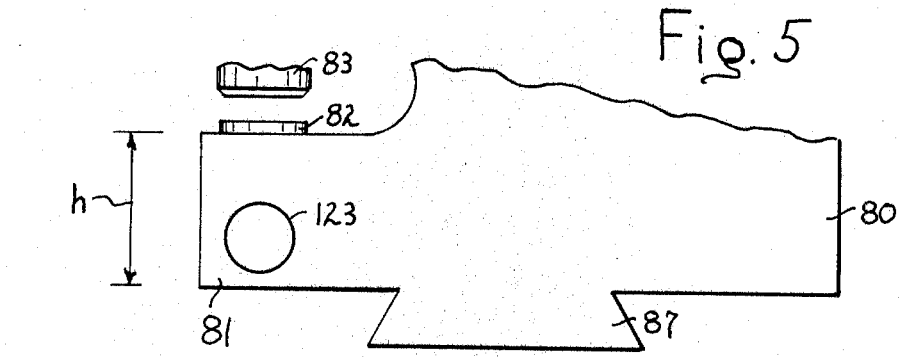
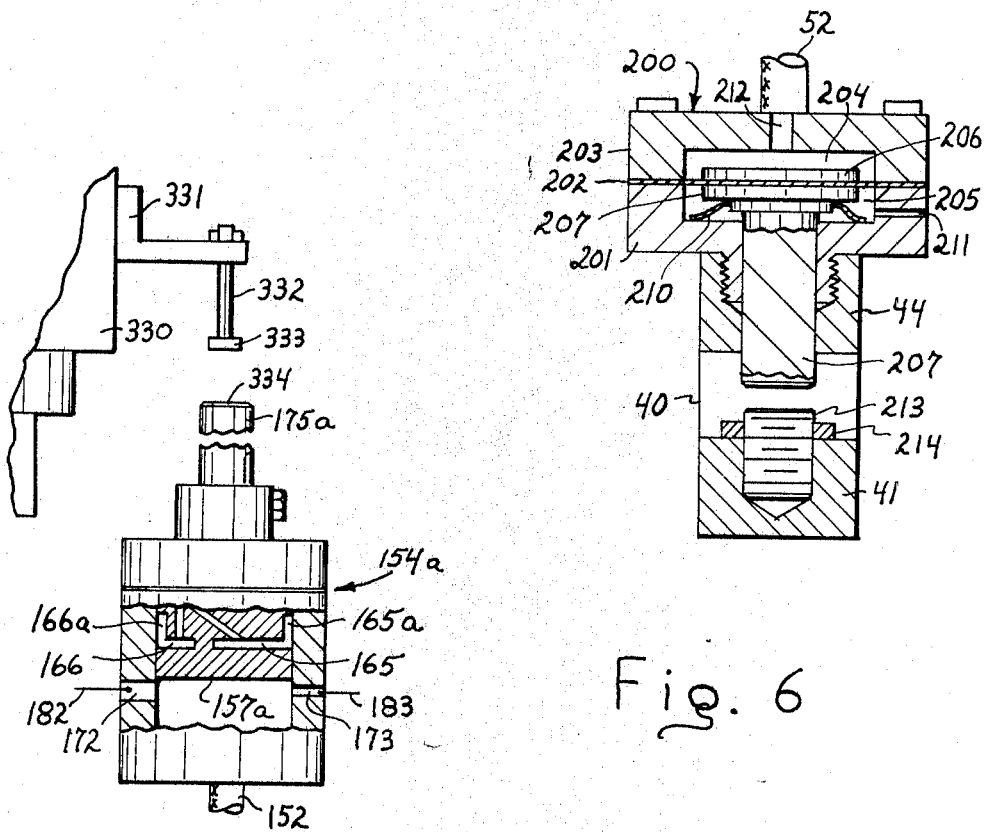

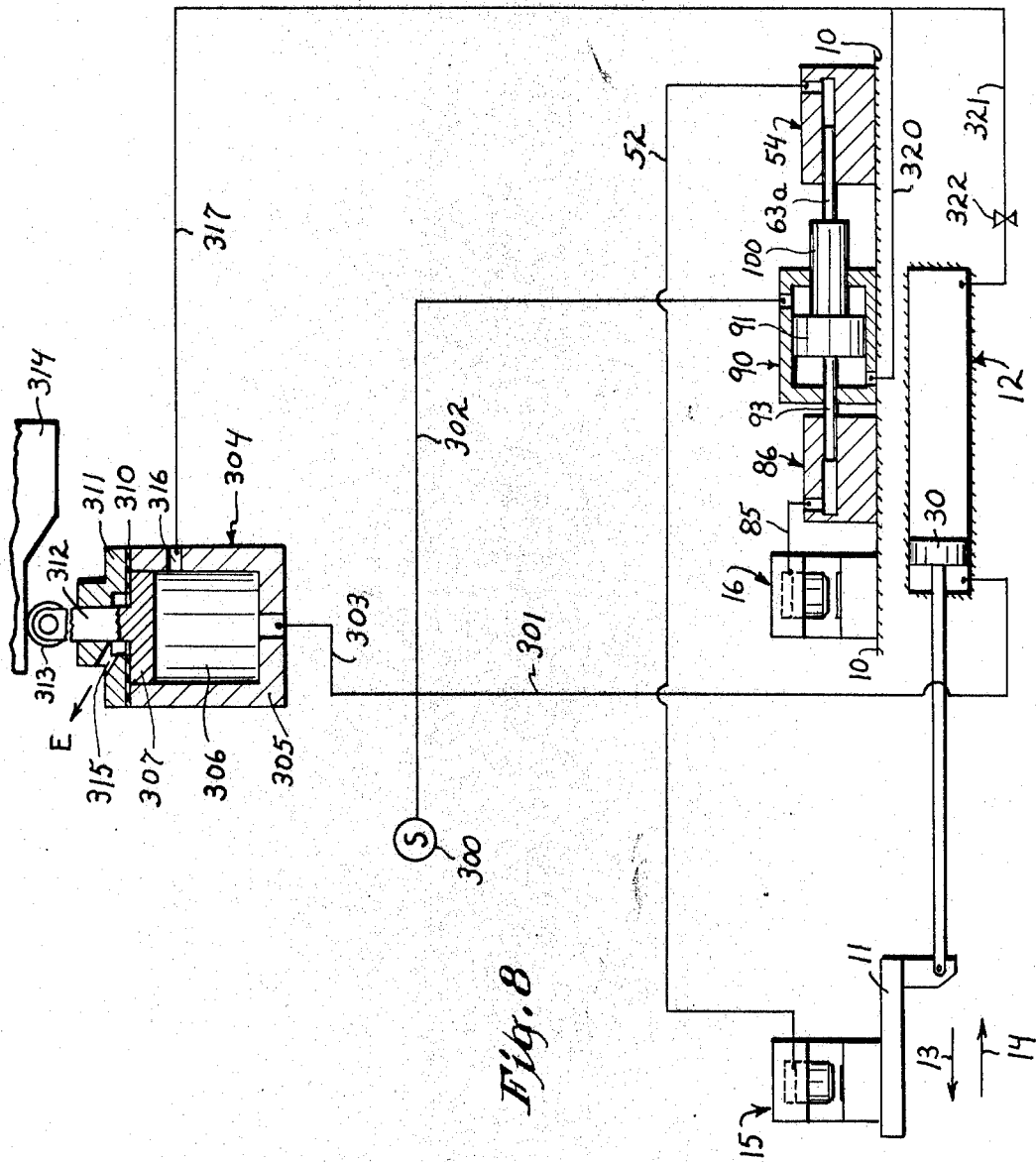

3,485,430
STOCK FEEDER
Albert W. Scribner, 6 Country Club Road,
Darien, Conn. 06821
Filed June 23, 1967, Ser. No. 648,377
Int. Cl. B65h 17/18
U.S. Cl. 226—141                                33 Claims

ABSTRACT OF THE DISCLOSURE

Stockfeeding apparatus having a hydraulic pumping means including a force multiplying arrangement, for applying the working forces to a stationary and a reciprocating work clamping device. The hydraulic pumping means and/or the reciprocating work clamping device are actuated in sequence by air motors under the control of a unitized air valving means which in first and second operative conditions functions respectively to supply and exhaust air to and from said air motors.

---

This invention relates to a novel stockfeeding device for intermittently advancing work material into a work station. More particularly the invention relates to an improved stockfeeding apparatus which is capable of more efficiently feeding the larger sizes of strip stock into a punch press or the like.

Those commercially available stock feeders that are capable of intermittently feeding larger sizes of strip stock, i.e. wider than say six inches, to a work station are for the most part relatively complex, cumbersome and expensive when considering the relatively simple stock advancing function which they perform. Further these conventional feeders are quite limited in the cyclic speeds at which such larger stock sizes may be accurately fed. The instant invention contemplates overcoming these limitations by using a relatively simple arrangemnt of parts which includes a hydraulic stock clamp actuating means that is operated by an air motor means having a novel control interconnection with the other air motor means of the stock feeding device.

One object of the instant invention is to provide a more efficient and lower cost stock feeding device for intermittently advancing strip stock into punch presses and the like.

Another object of the instant invention is to provide an improved force multiplying means between a work gripping means and the actuating means therefor which will allow the necessary stock gripping forces to be readily generated without requiring the use of excessively heavy linkages and/or actuating motors therefore.

Another object of the invention is to provide a novel pneumatic hydraulic system for operating the work clamping means of a stock feeding device.

Another object of the instant invention is to provide a more efficient stock feeding apparatus wherein a plurality of fluid operating motors are supplied with fluid pressure so as to thereby produce one operative stroke of the apparatus and are connected to exhaust so as to produce another operative stroke of the instant apparatus; the stock clamping means being operated by an air actuated hydraulic pumping means.

Another object of the invention is to provide a more efficient air operated stock feeder that is arranged so that the operational air consumption rates can be minimized for various adjusted lengths of feed strokes of the feeder.

Another object of the invention is to provide a novel stockfeeding device wherein a relatively simple low cost air valving system is afforded for controlling the supply and exhaust of air pressure to and from the several air motors of the instant device.

Other objects and advantages of the present invention will become apparent as the disclosure progresses.

In the drawings:

FIG. 1 is a front elevational view of the instant stockfeeding device.

FIG. 2 is a plan view of the apparatus illustrated in FIG. 1.

FIG. 3 is an enlarged sectional view taken along section line 3—3 of FIG. 2.

FIG. 4 shows a circuit diagram for the instant apparatus and a partial axial sectional view of a valve means for controlling the various fluid motors of the stockfeeding device of FIGS. 1–3.

FIG. 5 is a side elevational view and shows the profile form of the instant stationary stock clamping block.

FIG. 6 is a front vertical sectional view illustrating a modified embodiment for the hydraulic drive motor for the instant stock gripping means.

FIG. 7 is a fragmentary view in partial section and illustrates an alternate construction and application for the valve means of FIG. 4.

FIG. 8 shows an alternate circuit diagram for the instant apparatus together with a partial axial sectional view of a modified valve means for controlling the stockfeeding device of FIGS. 1–3.

Referring principally to FIG. 1 the general organization of the instant stock feeder includes a base plate 10 on which is mounted a carriage or feed head 11 that is adapted to be reciprocated, by means of a double acting fluid motor 12, in a stockfeeding direction 13 and in an indexing direction 14. A pneumatic-hydraulic powered stock gripping means 15 is mounted on feed head 11 for movement therewith while a similar pneumatic-hydraulic powered stock retaining or clamping means 16 is stationarily carried by the base plate 10. A fluid valve means to be described controls the operation of the various fluid motors so that the device functions to intermittently advance strip stock or the like along a feed path 119 and into the press work station.

Describing the instant device in more detail and referring to FIGS. 1–3 there is shown a frame comprising the base plate 10 that is adapted to be stationarily mounted by any suitable means adjacent the die bolster of a punch press or the like. The upper surface of base plate 10 is formed with a longitudinally extending dovetail groove 20, FIG. 3 in which is disposed for sliding movement a dovetail projection 21 formed on the lower side of the plate like feed head 11. The base plate 10 is provided with a slot 23 that extends longitudinally along the bottom of said dovetail groove and through which extends a blade-like member 24 that is connected at its upper end by suitable fastening means 25, FIG. 1, to the carriage or feed head 11. The fastening means 25 has been omitted from FIG. 2 for the sake of clarity in the FIG. 2 illustration. The lower end of the member 24 is coupled by means of a pin 26 to the outer end of a piston rod 27 that is connected to a piston 30 disposed in the air cylinder 31 of said motor 12. Air or other fluid media is adapted to be conducted through suitable cylinder ports 32 and 33 to and from either operative end of the double acting motor 12 by means of flexible conduit lines 34 and 35 respectively. The fluid motor 12 is secured to the lower side of base plate 10 by a special arrangement that is described below.

The feed head 11 carries the stock gripping means 15 which comprises a C-clamp type block 40, having a lower jaw 41 at the left end thereof, as seen in FIG. 3, on which is secured a disc like pad 42 that is adapted to engage and support the lower side of the stock 43 to be advanced. An integral upper jaw 44 on block 40 is formed with a cylindrical bore 45 in which is slidably mounted a hydraulic piston 46, the latter extending below the lower side of said jaw 44 and coaxially towards said pad 42. The lower end of the hydraulic piston 46 effectively defines a stock gripping member 47 that is adapted to be moved downwardly (as seen in FIG. 1) to a stock gripping position in cooperation with said pad 42, and to be moved upwardly to a stock releasing position shown in FIGS. 1 and 3. Any suitable means may be used to bias the hydraulic piston upwardly such as a heavy leaf type spring 48, FIG. 3, having one end thereof secured to the adjacent portion of the block 40 and having the other end thereof received in a recess 50 formed in the adjacent side of said piston. The upper end of the bore 45 is provided with a port 51 which is hydraulically connected by means of suitable flexible tubing 52 to the output port 53 of a hydraulic pump 54. (Port 53 is shown in dotted line in FIG. 2 to illustrate its location above the axial sectional plane of the pump 54 as seen in FIG. 2.) Port 53 communicates, through a fluid conduit bore 55, with the outer end of a hydraulic pumping cylinder 56 that extends axially through most of the length of the cylindrical pump block 57. Pump block 57 is coaxially secured by any suitable means to the end of an air motor 60 that is fixedly mounted on the feed head 11. The air motor 60 comprises a piston 61 which is slidably mounted in the cylinder 62 and to which is connected a piston rod 63 the lower end 64 of which extends into the upper end (FIG. 2) of said pumping cylinder 56 so as to thereby effectively define the working plunger for said hydraulic pump 54. A port 65 pneumatically couples the upper end of the air cylinder 62 with a suitable flexible air conducting tube or line 66. A port 70, FIG. 2, vents the lower end of the air cylinder 62 to atmosphere while a compression spring 67 biases the piston 61 to its upper position shown in FIG. 2.

As will be apparent the springs 48 and 67 normally retain the hydraulic piston 46 and air piston 61 in their stock release positions illustrated in FIGS. 1–3. When the air pressure is supplied to the upper end of air cylinder 62 the piston 61 will be driven downwardly, FIG. 2, together with the hydraulic plunger 64 defined by the lower end of the piston rod 63. The resultant hydraulic pumping action of plunger 64 will cause hydraulic fluid which fills the closed hydraulic system, defined by the cylinder 45, bore 56 and the fluid conduit lines 52 and 55 therebetween, to be forced out of the pumping cylinder 56 and into gripping engagement with the stock 43, FIG. 3, to be advanced. When the air pressure in the upper end of air cylinder 62 is exhausted through line 66 the springs 48 and 67 will respectively restore pistons 46 and 61 to their said normal stock releasing positions. Any suitable means, such as flexible sealing cup 71, FIG. 1, and the diaphragm arrangement described below in connection with FIG. 6, may be used to effectively seal the opposite ends of said closed hydraulic system.

It will be noted that the effective cross sectional area of the plunger 64 is much less than that of the piston 46 thus affording a first force multiplying stage for the actuation of the stock gripping means 15. Further the cross sectional area of the pumping plunger 64 is much smaller that the cross sectional area of the air piston 61 thus affording a fluid pressure intensifying stage for the actuation of the stock gripping means 15. By this two stage fluid coupling arrangement a very high gripping force may be applied to the stock 43 by the use of a relatively small size air motor 60. The stock gripping means 15 is actuated in time relation to the operation of the stock advancing air motor 12 as will be described below. The hydraulic piston 46 and related parts, as well as the pad 42 are generally illustrated in FIGS. 1–3, however, a more detailed description of a preferred arrangement here will be made later in connection with FIG. 6. Any suitable means, such as is diagrammatically illustrated at 77, FIG. 1, may be used to appropriately bleed the hydraulic system and to adjust the normal position of the said stock gripping member 47 where such functions are required.

The stationary stock clamping or retaining means 16 is mounted on the base plate 10 near the rearward end 79, FIG. 2 (i.e. the right hand end as seen in FIGS. 1 and 2), of the said dovetail slot 20 formed on the upper side of said base plate, the flat upper surface 72, FIGS. 1 and 2, of the rearward portion of the base plate being substantially coplanar with the bottom of said dovetail groove 20. In that the stock clamping means 16 and the actuating means therefore are constructed and arranged in a manner similar to that described above for the stock gripping means 15 a detailed discussion thereof will be limited principally to those features which differ from those of the stock gripping means 15. The C-clamp type block 80 and its associated lower jaw 81, stock clamping pad 82, upper jaw, hydraulic piston 83, stock clamping means 84, flexible conduit 85, hydraulic pump 86, and the closed hydraulic system are all constructed and arranged in a manner similar to that described for the corresponding parts associated with the previously described stock gripping means 15 and hence need not be further discussed in here. The lower end of the block 80 is extended downwardly and formed with a dovetail projection 87, FIG. 5, which is slidably received in the said dovetail groove 20 formed in said base plate 10. The vertical height h, FIG. 5, of the lower jaw 81 is substantially equal to the dimension H of FIG. 3 so that the upper surface of pad 82 may be substantially coplanar with the upper surface of pad 42.

The hydraulic pump 86 is coaxially secured by any suitable means to the adjacent end of a double acting air motor 90. The air motor 90 comprises a piston 91 that is slidable in a cylinder 92, the piston 91 having a piston rod 93 connected thereto which has a lower end 94 which extends into the pump 86 in a structural and functional manner similar to that described for the plunger end 64 of said piston rod 63. The upper and lower ends (as seen in FIG. 2) of air cylinder 92 respectively communicate through cylinder ports 95 and 96 with suitable flexible air lines 97 and 98. The piston 91 has connected thereto on the opposite side from piston rod 93 another coaxial piston rod 100 which extends through a sliding seal at the upper end (as seen in FIG. 2) of the cylinder 92. The cross sectional area of piston rod 100 is greater than that for piston rod 93, the function of this enlargement of the piston rod 100 being to make the effective cross sectional area of the upper side of piston 91 less than that for the bottom side (as seen in FIG. 2) of said piston 91. The relative effective sizes of the hydraulic piston 83, plunger 94 and air piston 91 again affords a two stage force-amplifying and fluid pressure intensifying arrangement for actuation of the stock clamping means 16 that is similar to that described above for the actuation of the stock gripping means 15. The air motor 90 is secured on the base plate 10 by any suitable fastening means.

The block 80 for the stock clamping means 16 is adjustably mounted on the base plate 10 by means of three screws 110, 111, 112 which extends through suitable holes formed through the forward cylinder head block 113 of air motor 12. The head block 113 extends laterally beyond the radial outer sides of the air motor 12 and is almost as long as the block 80 as may be seen from FIG. 2. The screws 110, 111 and 112 also extend through suitable aligned holes in the base plate 10 and are threadedly received in tapped holes in the bottom of block 80. Similar screws 114 and 115 extend through suitable holes in the rearward head block 116 of the air motor 12 and are threadedly received in suitable tapped holes in the base plate 10. When the screws 110, 111, 112, 114 and 115 are tightened the air motor 12 and the block 80 of the stock clamping means 16 will be thereby fixedly secured as a unit to the base plate 10. Two sets of additional holes 117 formed in the base plate 10 are provided for screws 110, 111, 112, and two additional sets of holes 120 in the base plate are provided for screws 114 and 115 the longitudinal spacing between the sets of holes 117 being the same as that between the sets of holes 120 so that said block 80 and the air motor 12 may be positionally adjusted as a unit on the base plate whereby a coarse adjustment is afforded for varying the operative length of stroke of the feed head 11. It will be understood that flexible conduit line 85 is made long enough to extend from the hydraulic pump 86, which is fixed relative to base plate 10, to the block 80 when the latter is in any one of its three adjusted positions. If desired the air motor 90 and pump 86 may be secured to said block 80 so as to be adjustably moved with that latter. By so allowing the stock clamping means 16 and the air motor 12 to be adjusted together as a unit along the stock feed path 119, FIG. 1, the volume of the air cylinder on the right side of piston 30, as seen in FIG. 1, is kept to a minimum and the air consumption required for this end of the cylinder 31 is thereby minimized.

A fine adjustment means for varying the feed stroke of the feed head 11 is provided and comprises a heavy stop screw 121 which threadedly extends through the lower jaw 81 of block 80 and is locked in rotative adjusted position by any suitable means such as lock nut 122. The forward end 123, FIG. 2, of stop screw 121 is positioned so as to engage and determine the rearward limit of movement of feed head 11 in the indexing direction 14 as is illustrated by the dotted lines in FIG. 1. The forward limit of movement of the feed head is determined by an abutment block 124 that is fixedly secured by any suitable means to forward end of the base plate 10.

A buffer unit 125 is provided on the feed head 11 for cooperation with the fixed and adjustable stop means 124 and 121 so as to smoothly decelerate said feed head at the end of each indexing and feed stroke thereof. The unit 125 comprises an abutment bar 126 that is slidably mounted on the feed head 11 and is disposed between the lower side of said feed head 11 and the upper surface of base plate 10 (as is best seen in FIG. 3). The bar 126 is mounted for longitudinal movement relative to feed head 11 by means of pins 130 and 131 which are threadedly secured to the bar 126 and which respectively extend upwardly through slots 132 and 133 formed in the feed head 11. As will be apparent when the forward or left end (as seen in FIG. 2) of bar 126 engages the abutment block 124 at the end of a stock feed stroke the pins 130 and 131 will be moved towards the right ends of the slots 132, 133 respectively. The pins 130 are longer than ward end 134 of the bar 126 will be displaced to the right beyond the rearward edge 135 of the feed head 11 as is also illustrated in FIG. 2. Conversely when the rearward end of bar 126 engages the forward end 123 of the adjusting screw 121 (as illustrated at 126 in FIG. 1) at the end of an indexing stroke of the feed head the pins 130, 131 will be displaced towards the left ends of slots 132, 133 respectively. The pins 130 are longer than pin 131 and extend above the upper surface of the feed head 11 so as to engage the peripheries of two decelerating cams 140, 141 that are pivotally mounted on said upper feed head surface by means of fixed studs 142 and 143, FIG. 1. The cam 140 is pivotally biased in a counterclockwise direction by any suitable means such as torsion spring 144 while cam 141 is biased in a clockwise direction by a torsion spring 145. Both cams are thus pivotally biased into engagement with the pin 130. The operative peripheral surfaces 146 and 147 of the respective cams 130, 131 are similar and each is contoured so as to define a portion of a spiral of decreasing radius so that upon being engaged by the translating pin 130 the cams are pivoted against the action of their respective biasing springs, the mechanical advantage between the linear movement of pin 130 and the resultant pivotal movement of either cam 130 or 131 becoming greater and greater as cam rotation continues so that the linear movement of pin 130, and thus the feed head 11, is controllably slowed down before the forward end of the feed head finally engages the abutment block 124 or the rearward end 135 of the feed head finally engages the end 123 of the stroke adjusting screw 121. In this manner the buffer unit 125 serves to cushion the arresting of the feed head at the end of each operative stroke of the latter. Any conventional or known buffer unit may be used in place of the particular mechanical type of buffer unit illustrated and described.

Referring to FIG. 4 a normally open three-way control valve means, and associated circuitry for controlling the operation of the three air motors 12, 60 and 90 are shown. Here a source 150 of air pressure is connected by an air line 151 directly to the said air line 34 that services the left (as seen in FIG. 4) or feed head retracting end of the air motor 12 to thereby continuously bias the piston 30 and thus the feed head 11 in an indexing direction 14. The fluid pressure source 150 is also connected by line 151 directly to line 97 so as to continuously bias air piston 91 to the left, as seen in FIG. 4, and thus bias said stock clamping means 16 to a stock clamping position. The pressure source 150 is also directly connected by a line 152 to an air supply port 153 in the control valve means generally indicated at 154. Valve means 154 comprises a body member 155 having a cylindrical valve chamber 156 formed therein. A valve member 157 is movably mounted in said chamber and is biased in an upward direction, as seen in FIG. 4, by the continuous supply of fluid or air pressure in the lower portion of said chamber 156. The upper end of chamber 156 is closed by a cap 160 that is secured by any suitable means, such as screws 161, to the valve body 155, a gasket 162 being provided for sealing purposes between said cap and valve body. The upper limit of movement of the valve member 157 is determined by engagement of the annular outer surface of the upper shoulder 163 of said valve member with said gasket thus normally sealing off an exhaust passage 164 formed in said cap from the lower portion of the valve chamber 156 wherein fluid pressure continuously exists. Valve member 157 is formed with coaxially aligned bores or holes 165 and 166 and also with holes 167 and 170, the latter two holes communicating with each other at their respective upper ends at said upper valve member surface 163 while their lower ends respectively communicate with said holes 165 and 166. The radially outer edges of the lower face 171 of valve member 157 and the holes 165 and 166 are adapted to alternately cooperate with a pair of coaxially aligned outlet bores 172 and 173 formed in the walls of said valve body 155. The bore 172 has a larger diameter (or at least a longer vertical dimension on either side of its horizontal center line) than the bore 173 for reason to be discussed below. The upper end of valve member 157 is provided with a stem 175 which extends centrally through cap 160 and has a roller 176 mounted at its upper end for cooperation with a cam 177 that is operatively mounted in a well known manner on the ram of the punch press to which the instant stock feeder is coupled. The valve member 157 is adapted to move axially but is restrained against rotative movement, relative to the valve body 155, by means of a key 180 that cooperates with an elongated keyway 181 formed in said valve stem 175.

The valve outlet bore or port 172 is connected by a line 182 to both the line 98 for the left end of cylinder 92 of air motor 90 and the line 66 for the operative end of the cylinder 62 of air motor 60. Thus the valve port 172 is adapted to control the air motors 60 and 90 which in turn respectively actuate the stock gripping means 15 and the stock clamping means 16 through said closed hydraulic systems. The smaller valve outlet bore or port 173 is connected by a line 183 to the line 35 servicing the right end of air motor 12 as seen in FIG. 4. Any suitable restriction means 184 may be provided in line 183 so as to control the rate of air flow to and from line 35 whereby the speed of movement of the feed head 11 in either direction 13 or 14 may be adjustably controlled.

Describing now the operation of the control means illustrated in FIG. 4, the cam 177 is in the position shown when the press ram is near its top dead center position. In this condition of the parts and circuit the valve member 157 remains biased in its upper sealed FIG. 4 position so that ports 172 and 173 are exposed to the fluid pressure in chamber 156 whereby air motor piston 61 is displaced to the left against the action of spring 67, air motor piston 91 is displaced to the right against the continuous fluid biasing action on the right side of said piston 91 and air motor piston 30 is displaced to the left against the continuous fluid biasing action on the left side of piston 30. Under this normal operative condition the stock gripping means 15 is actuated to a stock gripping position, the stock clamping means 16 is moved to a stock release condition, and the feed head is moved in the feed direction 13 to its forward limit of movement. When the press cam moves downwardly as indicated by arrow 190 the inclined portion 191 of the cam 177 will cause the valve member 157 to be moved against the upward biasing action of the continuous air supply pressure in the lower portion of chamber 156. During the downward movement the lower edge 171 of the valve member will first cover said ports 172 and 173 and then the bores 165 and 166 will move into registry with said ports 173 and 172 respectively so that air pressure may exhaust from lines 183 and 182 through bores 165 and 166 respectively and through bores 167 and 170 respectively and out through the now open exhaust port 164. It will be noted that because the port 172 has a larger diameter than the coaxially aligned port 172 the initiation of the exhaust flow of air pressure from line 182 will occur before the initiation of the exhaust flow of air pressure from lines 183 and thus the rightwardly biased air motor piston 61 will move to the right and also the leftwardly biased air motor piston 91 will move to the left before the rightwardly biased air motor piston 30 commences to move to the right. In this way the stock gripping means 15 is moved to a release position and the stock clamping means 16 is moved to a stock clamping position before the feed head 11 commences its rightward indexing stroke in direction 14.

When the press ram moves upwardly, as indicated by arrow 192, after a punching operation has been completed the said cam surface 191 will permit the upwardly biased valve member 157 to be moved back to its upper or normal position shown in FIG. 4. During this upward movement the ports 172 and 173 are initially blocked off by the periphery of valve member 157 and when the lower edge 171 of said valve member moves above said ports 172, 173 air pressure is again admitted to the air lines 182 and 183. Again it will be noted that because the port 172 is larger in diameter than port 173 the initiation of flow of air pressure into line 182 will occur slightly before the initiation of flow of air pressure into the air line 183 so that the air motor piston 61 moves to the left and also air motor piston 91 moves to the right (against their respective biasing actions) before air motor piston 30 moves to the left against its rightward biasing action. In this way the stock gripping means 15 is actuated to a stock gripping position and the stock clamping means 16 is actuated to a stock releasing position before said feed head 11 commences its stock feeding stroke in a leftward direction as indicated by arrow 13.

As will be apparent when cam 177 is reciprocated the instant stock feeding device will be actuated through alternate indexing and stock feeding strokes whereby the stock material will be intermittently advanced into the work station of the associated punch press or the like. In FIG. 4 the port 172, and the hole 166 and left side edge of surface 171 may be collectively considered to be a three way valving unit for line 182, while the port 173, and the hole 165 and right side edge of said surface 171 may be collectively considered to be a three way valving unit for the line 183.

Referring now to FIG. 6 a specific embodiment for the hydraulic drive for the stock gripping means 15 is illustrated. Here a diaphragm type hydraulic motor 200 that is operatively mounted on the block 40 comprises a lower housing 201 which is threaded into the upper jaw 44 of said block 40. A flexible diaphragm 202 is sealing secured between said lower housing and an upper housing 203 so as to define a hydraulic chamber 204 on the upper side of the diaphragm and a venting chamber 205 below said diaphragm. The upper housing 203 and the diaphragm 202 are secured to the lower housing 201 by any suitable fastening means. Disc like plates 206 and 207 are centrally secured on either side of the diaphragm 202 and are connected by any suitable means to the upper end of the stock gripping member 207. A suitable spring 210 biases the diaphragm and member 207 to their upper or release positions and a suitable bore 211 formed through the lower housing 201 serves to vent the chamber 205 to the atmosphere. The hydraulic line 52 communicates with chamber 204 through a port 212 formed in said upper housing 203. The lower end of the stock gripping member 207 cooperates with a vertically adjustable foot 213 that is threadedly mounted on the lower jaw 41 of block 40 and is adapted to be rotatively secured in any selected adjusted position by means of a lock nut 214. This arrangement will facilitate the set up procedure for adjusting the instant stock feeder so as to accept varying thicknesses of stock to be fed. As will be apparent when hydraulic pressure is applied through line 52 to the chamber 204 the member 207 will be moved downwardly to a stock gripping position in cooperation with the foot 213. When said hydraulic pressure is exhausted from chamber 204 the spring 210 will restore member 207 to its upper stock releasing position. A similar hydraulic motor and foot arrangement may be used in connection with the block 80 of the stock clamping means 16.

An alternate arrangement for the valve means and air circuitry is illustrated in FIG. 8. Unless otherwise indicated the various elements illustrated in FIG. 8 are substantially the same as those correspondingly numbered and described in connection with FIGS. 1–4. The double acting air motor 90 and the two hydraulic pumps 86 and 54 are axially aligned and mounted on machine frame or base plate 10 by any suitable fastening means. The piston rod 93 is arranged to operate said pump 86 as above described while piston rod 100 is operatively coupled to the adjacent end of the hydraulic plunger 63a of the pump 54, plunger 63a corresponding to plunger 63, 64 of FIGS. 1–4. The flexible hydraulic lines 52 and 85 in this case are made long enough to reach any operative position of said stock gripping means 15 and said stock clamping means 16 respectively. A fluid pressure source 300 is again connected by lines 301 and 302 directly to the left end of air motor 12 and to the right end of air motor 90 respectively so as to again continuously bias piston 30 and the feed head 11 in an indexing direction 14 and to continuously bias the air piston 91 to the left so that the stock gripping means 15 is moved to a release position while the stock clamping means 16 is moved to a stock clamping position. Source 300 is also connected by a line 303 to the supply port of a three way valve means 304. Valve means 304 comprises a valve body 305 that is formed with a cylindrical air supply chamber 306 in which is slidably mounted a single valving member 307 that is continuously biased upwardly to a normal position shown in FIG. 5 by the continuous air pressure existing in the lower part of chamber 306. The upper end of chamber 306 is closed by means of a suitable gasket 310 and a cap 311, the stem 312 of the valve member extending through a suitable bore in said cap 311. A roller 313 mounted at the upper end of valve stem portion 312 cooperates as above described with a cam 314 mounted on the associated press ram. An exhaust port 315 is formed in the cap 311 and an outlet port 316 is formed through the walls of the valve body 305, the port 316 being connected by a line 317 and lines 320 and 321 to the left end of air motor 90 and the right end of air motor 12 respectively. Any suitable restriction means 322 may be provided in the line 321 so that the rate of air flow to and from the right end of air motor 12 may be adjustably controlled so as to vary the operative speed of movement of feed head 11.

In the operation of the control arrangement illustrated in FIG. 5 the normal or open position shown for valve member 307 seals off the lower portion of chamber 306 from the exhaust port 315 and permits fluid pressure to flow through port 316 and line 317 to said air motors 90 and 12 so that the stock gripping means 15 is moved to a stock gripping position and the stock clamping means 16 is moved to a stock releasing position, and the feed head 11 is moved through a stock feeding stroke in direction 13. During the descent of the press ram the cam 314 will cause said valve member to be moved downwardly as above described so that port 316 is first isolated from the lower portion of the air supply chamber 306 and is then placed in communication with the exhaust port 315 whereby air pressure from line 317 may exhaust through the upper portion of the valve chamber and out through said exhaust port 315. Under these conditions the continuously biased air motor piston 91 will be moved to the left and will thus cause said stock gripping means 15 and said stock clamping means 16 to be moved to their releasing and clamping positions respectively, and the continuously biased air motor 12 to move the feed head 11 in an indexing direction 14. During the upward movement of the press ram the upwardly biased valve member 307 will be returned to its normal position shown in FIG. 5. This upward shifting of the valve member 307 will again effectively isolate the exhaust port 315 from port 316 through which fluid pressure may now again flow to line 317 so as to cause the feeder to execute another operative stock feeding stroke. As will be apparent the instant stock feeder is actuated through alternate stock feeding strokes and indexing strokes under the control of the reciprocating motion of the press ram. In the control arrangement of FIG. 8 instead of using a single duplex air motor, two individual air motors, such as 60 and 90 of FIG. 1, may be operated by said line 320 to respectively actuate the pumps 54 and 86; these pumps and motors all being mounted on said base plate 10.

A slight variation in the construction and operation of the valve 154, FIG. 4, is illustrated in FIG. 7. Here a press ram 330 has a bracket 331 secured thereto which fixedly carries a depending actuating bolt 332. The lower head 333 of said bolt is adapted to engage the flat upper end 334 of the valve stem 175a and depress the latter during the lower portion of the ram movement. The only other modification made in valve means 154a, which in all other respects is similar to valve 154, FIG. 4, is in the provision of grooves 165a and 166a, in the valve member 157a which grooves respectively extend upwardly from the radially outer ends of said bores 165 and 166. By this arrangement the valve member 157a may accommodate a continued downward movement of the press ram after bores 165 and 166 have become respectively coaxially aligned with the outlet ports 173 and 172. In this way ports 173 and 172 may continue to be pneumatically connected to the valve exhaust port 164 (see FIG. 4) during this downward overtravel movement of the press ram and valve member 157a. The valve and valve actuating arrangement shown in FIG. 7 permits a very simple quick set up procedure to be used when operatively installing the instant feeder on a punch press or the like.

Since many changes could be made in the embodiment of the invention particularly described and shown herein without departing from the scope of the invention it is intended that these embodiments be considered as exemplary and that the invention not be limited except as warranted by the following claims.

What is claimed is:

1. A stock feeding device operable through alternate feed and indexing strokes for intermittently advancing stock into a work station: comprising
   a main frame;
   a feed head mounted on said main frame for reciprocation in feed and indexing directions;
   stock gripping means mounted on said feed head for movement between stock gripping and stock releasing positions;
   a first main fluid motor means for reciprocally actuating said feed head;
   a second fluid motor means for actuating said stock gripping means;
   a first fluid conduit means communicating with said first fluid motor means;
   a second fluid conduit means communicating with said second fluid motor means;
   a first three-way valve means for controlling the flow of fluid pressure to and from said first fluid conduit means and said first fluid motor means for controlling the actuation of said feed head;
   a second three-way valve means for controlling the flow of fluid pressure to and from said second fluid conduit means and said second fluid motor means for controlling the actuation of said stock gripping means; and
   mechanical coupling means mechanically interconnecting said first and second valve means so that the mechanical operation of one of said valve means can also produce the mechanical operation of the other one of said valve means, said coupling means causing the initiation of the valving action of said second three-way valve means to occur before the initiation of the valving action of said first three-way valve means.

2. Apparatus as defined by claim 1 wherein said first and second fluid valve means includes a valve member that is movably mounted in a valve body, said valve member having a pair of effective valving portions cooperating respectively with a pair of effective valving portions formed in said valve body, the relative location of the two valving portions of one of said pairs being such that one of such valving portions is displaced relative to the other in the direction of movement of said valve member.

3. Apparatus as defined by claim 1 wherein said first and second fluid valve means are normally conditioned to supply fluid pressure to said first and second fluid conduit means so as to produce a stock feeding stroke of said device, and wherein said first and second fluid valve means may be operatively conditioned to exhaust fluid pressure from said first and second fluid conduit means so as to produce an indexing stroke of said device.

4. Apparatus as defined by claim 1 wherein said valve means are arranged so that said first valve means conducts fluid pressure to said first fluid conduit means while said second valve means is conducting fluid pressure to said second fluid conduit means.

5. Apparatus as defined by claim 1 wherein said mechanical coupling means comprises a common valve stem means which operates both of said valve means.

6. Apparatus as defined by claim 1 wherein said second fluid motor means includes a hydraulic motor means for actuating said stock gripping means, and an air operated pumping means for supplying hydraulic pressure fluid to said hydraulic motor means.

7. Apparatus as defined in claim 1 additionally comprising rotatable cam means for controllably decelerating said feed head at the end of a feed stroke thereof.

8. In a stock feeding device that is adapted to be operated through alternate indexing and stock feeding strokes:
   a frame;
   a feed head carried by said frame for reciprocal movement in indexing and feed directions;
   fluid motor means carried by said frame for actuating said feed head;
   a stock gripping means mounted on said feed head and adapted to be moved to stock gripping and stock release positions;
   a first actuating means for actuating said stock gripping means between said stock gripping and stock release positions;
   a stock clamping means mounted on said frame and adapted to be moved between stock clamping and stock releasing positions;
   a second actuating means for actuating said stock clamping means between said stock clamping and release positions; and
   means for securing both said stock clamping means and said first fluid motor means in unison on said frame for adjustment together to selected positions along the length of the stock feed path so that the volume of pressure fluid required to actuate said first fluid motor means is minimized.

9. In a feeding device having:
   a frame;
   a feed head reciprocally mounted on said frame for movement in feed and indexing directions;
   stock gripping means adapted to be moved to stock gripping and stock releasing positions;
   a first fluid motor means for actuating said feed head; and
   a second fluid motor means for actuating said stock gripping means; the improvement comprising:
   valve means including a valve body having a fluid pressure supply chamber therein that is adapted to be coupled to a continuous source of fluid pressure;
   a first fluid conduit means operatively coupled between a first port in said fluid supply chamber and said first fluid motor means;
   a second fluid conduit means operatively coupled between a second port in said fluid supply chamber and said second fluid motor means;
   said valve means being provided with exhaust conduit means; and
   a movable valving member disposed in said chamber and being adapted to be moved back and forth between two operative conditions, said valving member having a first valving portion adapted to cooperate with said first port and having a second valving portion adapted to cooperate with said second port;
   said first valving portion and said first port being dimensioned relative to said second valving portion and said second port so that during movement of said movable valving member to one of said operative conditions said second port is the first to be opened to the fluid pressure in said supply chamber and said first port is subsequently opened to the fluid pressure in said supply chamber, and so that during movement of said movable valving member to the other one of said operative conditions said second port is the first to be opened to said exhaust conduit means and said first port is subsequently opened to said exhaust conduit means.

10. Apparatus as defined by claim 9 wherein said chamber and said movable valving member comprise a piston-cylinder type arrangement, and wherein the fluid pressure in said supply chamber continuously biases said movable valving member towards that one of its said operative conditions wherein said first and second ports are open to the fluid pressure in said supply chamber.

11. In a stock feeding device adapted to be alternately actuated through indexing and stock feeding strokes:
   a frame;
   a feed head carried by said frame for movement in indexing and stock feeding directions;
   a first fluid motor means for actuating said feed head;
   a stock gripping means carried by said feed head and adapted to be moved to stock gripping and stock releasing positions;
   a second fluid motor means for actuating said stock gripping means between said stock gripping and stock releasing positions;
   fluid control valve means adapted to be coupled to a source of fluid pressure and to an exhaust means, said valving means comprising:
   a first valving unit operable in a first condition thereof to supply fluid pressure from said source to said first fluid motor means for said feed head, and operative in a second condition thereof to exhaust fluid pressure from said first fluid motor means;
   a second valving unit operable in a first condition thereof to supply fluid pressure from said source to said second fluid motor means for said stock gripping means, and operative in a second condition thereof to exhaust fluid pressure from said second fluid motor means; and
   an actuating means for placing both said first and second valving units in their respective first operative conditions whereby fluid pressure is supplied to both said first and second fluid motor means, and for placing said first and second valving units in their respective second operative conditions whereby fluid pressure is exhausted from both said first and second fluid motor means, said actuating means and said valving units being arranged so that said second valving unit attains an operative condition before said first valving unit attains the corresponding operative condition.

12. Apparatus as defined by claim 11 wherein said fluid control valve means comprises a valve body having a fluid supply chamber therein that is adapted to be coupled to a source of fluid pressure;
   a movable valve member slidably mounted in said chamber;
   a pair of conduit lines coupled to said supply chamber, said lines respectively terminating at two ports in said supply chamber, one of said ports having an effective sectional dimension in the direction of movement of said valve means that is greater than the corresponding dimension in the other of said ports;
   said movable valve member having valving portions formed therein for respectively cooperating with said ports, said ports thus being alternately coupled to said supply chamber and said exhaust means upon movement of said valve member.

13. A stock feeder for intermittently advancing stock into a work station: comprising
   a frame;
   a feed head mounted on said frame for movement in feeding and indexing directions;
   means for displacing said feed head in said feeding and indexing directions;
   a stock gripping means adapted to move between stock releasing and stock gripping positions and operative to grip said stock during movement of said feed head;

a hydraulic motor means for actuating said stock gripping means between said stock releasing and stock gripping positions;

a hydraulic pumping means for supplying hydraulic pressure fluid to said motor means;

a pneumatic motor means for actuating said hydraulic pumping means; and air valve means for controlling the operation of said pneumatic motor means.

14. Apparatus as defined by claim 13 wherein said hydraulic motor means includes a hydraulic piston, and wherein said hydraulic pumping means includes a hydraulic plunger; the cross sectional area of said piston being greater than that of said plunger.

15. Apparatus as defined by claim 13 wherein said hydraulic pumping means includes a hydraulic plunger, and wherein said pneumatic motor means includes a piston; the effective cross sectional area of said plunger being less than that of said piston in said pneumatic motor means.

16. Apparatus as defined by claim 13 wherein said pneumatic motor means is mounted on said frame.

17. Apparatus as defined by claim 13: additionally comprising a stock clamping means mounted on said frame and operative to move between stock releasing and stock clamping positions;

a second hydraulic motor means for actuating said stock clamping means;

a second hydraulic pumping means for operating said second hydraulic motor means; and motor means for actuating said second hydraulic pumping means.

18. Apparatus as defined by claim 17 wherein said means for actuating said first and second hydraulic pumping means includes a double acting air motor.

19. Apparatus as defined by claim 18: additionally comprising means for biasing said double acting air motor to one operative condition; and air valve means for supplying and exhausting air pressure to and from said double acting air motor whereby the latter may be placed in and released from its other operative condition;

said air valve means and said biasing means serving to alternately actuate said stock gripping means and said stock clamping means to their respective stock engaging positions.

20. Apparatus as defined by claim 13 wherein said pneumatic motor means is mounted on said feed head.

21. Apparatus as defined by claim 13 wherein hydraulic motor means includes a flexible diaphragm.

22. A stock feeding device operative through alternate indexing and stock feeding strokes: comprising a frame;

a feed head mounted on said frame for reciprocating movement in indexing and stock feeding directions;

a first fluid motor means for actuating said feed head;

stock gripping means mounted on said feed head and adapted to be moved between stock gripping and releasing positions;

a second fluid motor means for actuating said stock gripping means between said stock gripping and releasing positions;

a stock clamping means carried by said frame and adapted to be moved to stock clamping and releasing positions;

a third fluid motor means for moving said stock clamping between stock releasing and clamping positions;

a first fluid conduit means coupled to said first fluid motor means;

a second fluid conduit means coupled to said second fluid motor means;

a third fluid conduit means coupled to said third fluid motor means;

a first three-way valve means for controlling the flow of fluid pressure to and from said first fluid conduit means and said first fluid motor means for controlling the actuation of said feed head;

a second three-way valve means for controlling the flow of fluid pressure to and from said second and third fluid conduit means and said second and third fluid motor means for controlling the actuation of said stock gripping means and said stock clamping means; and mechanical coupling means mechanically interconnecting said first and second three-way valve means so that the mechanical operation of one of said valve means can also produce the operation of the other one of said valve means, said coupling means causing the initiation of the valving action of said second three-way valve means to occur before the initiation of the valving action of said first three-way valve means.

23. Apparatus as defined by claim 22, wherein said valve means are arranged so that said first valve means conducts fluid pressure to said first fluid conduit means while said second valve means is conducting fluid pressure to said second and third fluid conduit means.

24. Apparatus as defined by claim 22 wherein said second fluid motor means includes a hydraulic motor means for actuating said stock gripping means, and an air operated pumping means for supplying hydraulic pressure fluid to said hydraulic motor means.

25. Apparatus as defined by claim 22; additionally comprising means for mounting said stock clamping means in different selected positions on said frame.

26. A stock feeder for intermittently advancing stock into a work station; comprising a frame;

a feed head mounted on said frame for reciprocation in index and feed directions;

a first pneumatic motor means for actuating said feed head in at least one of said directions;

a stock gripping means mounted on said feed head and adapted to move between stock releasing and stock gripping positions and operative to grip said stock during movement of said feed head in said feed direction;

a hydraulic motor means for actuating said stock gripping means between said stock releasing and stock gripping positions;

a hydraulic pumping means for supplying hydraulic pressure fluid to said hydraulic motor means;

a second pneumatic motor means for actuating said hydraulic pumping means; and air valve means for controlling the operation of said first and second pneumatic motor means.

27. Apparatus as defined by claim 26 wherein said air valve means is operative to supply air pressure simultaneously to said first and second pneumatic motor means, so as to produce a stock feeding stroke of said feeder.

28. Apparatus as defined by claim 27 wherein said air valve means is adapted to initiate the supply of air pressure to said second pneumatic motor means before initiating the supply of air pressure to said first pneumatic motor means.

29. Apparatus as defined by claim 28 wherein said air valve means when in its normal condition serves to supply air pressure to said first and second pneumatic motor means.

30. Apparatus as defined by claim 26 wherein at least one of said pneumatic motor means is continuously pneumatically biased in one operative direction.

31. Apparatus as defined by claim 30 wherein said air valve means comprises a single three-way valve.

32. Apparatus as defined by claim 26 wherein said air valve means comprises two three-way valves.

33. Apparatus as defined by claim 26 wherein said air valve means initiates the supply of air pressure simultaneously to said first and second pneumatic motor means.

References Cited

UNITED STATES PATENTS

| | | | |
|---|---|---|---|
| 2,586,536 | 2/1952 | Haller | 226—162 X |
| 3,038,645 | 6/1962 | Nordloff | 226—162 X |
| 3,326,438 | 6/1967 | Dickerman | 226—162 X |
| 3,329,327 | 7/1967 | Scribner | 226—162 X |

FOREIGN PATENTS 929,573  12/1947  France.

ALLEN N. KNOWLES, Primary Examiner

U.S. Cl. X.R.

226—145, 150, 162